United States Patent
Ramsdale et al.

(10) Patent No.: US 8,275,664 B2
(45) Date of Patent: Sep. 25, 2012

(54) TRANSACTION SYSTEM AND METHOD

(75) Inventors: David Ramsdale, Melbourne (AU);
Robert Dennett, Sydney (AU); Gino Dompietro, Victoria (AU)

(73) Assignee: The Coca-Cola Company, Atlanta, GA (US)

( * ) Notice: Subject to any disclaimer, the term of this patent is extended or adjusted under 35 U.S.C. 154(b) by 576 days.

(21) Appl. No.: 11/577,764

(22) PCT Filed: Oct. 26, 2005

(86) PCT No.: PCT/AU2005/001661
§ 371 (c)(1),
(2), (4) Date: Aug. 1, 2007

(87) PCT Pub. No.: WO2006/045151
PCT Pub. Date: May 4, 2006

(65) Prior Publication Data
US 2008/0167966 A1    Jul. 10, 2008

(30) Foreign Application Priority Data
Oct. 26, 2004 (AU) ................ 2004906185

(51) Int. Cl.
*G06Q 20/00* (2006.01)

(52) U.S. Cl. ............ 705/18; 705/17; 705/44; 705/41; 705/35; 705/39; 705/40; 705/16; 705/23; 705/28; 705/27; 705/2; 235/492; 235/486; 235/380; 235/375; 235/379; 235/487; 235/381; 235/491

(58) Field of Classification Search ............ 705/18
See application file for complete search history.

(56) References Cited

U.S. PATENT DOCUMENTS

| | | |
|---|---|---|
| 2002/0178063 A1 | 11/2002 | Gravelle et al. |
| 2003/0110136 A1* | 6/2003 | Wells et al. .......... 705/64 |
| 2003/0139984 A1* | 7/2003 | Seigel .............. 705/28 |
| 2003/0187787 A1 | 10/2003 | Freund |
| 2004/0167852 A1* | 8/2004 | Cutler et al. .......... 705/39 |
| 2004/0210498 A1 | 10/2004 | Freund |

(Continued)

FOREIGN PATENT DOCUMENTS

| | | |
|---|---|---|
| DE | 10342710 A1 | 5/2005 |
| WO | 2006/024409 A2 | 3/2006 |

OTHER PUBLICATIONS

Global electronic money and related issues. Misra, Santosh K.; Javalgi, Rajshekhar (Raj) G.; Scherer, Robert F. Review of Business , vol. 25 , No. 2 , p. 15(10) , Spring 2004.*
Non-Final Office Action for U.S. Appl. No. 12/519,199 mailed Nov. 1, 2011.

*Primary Examiner* — F. Zeender
*Assistant Examiner* — Fawaad Haider
(74) *Attorney, Agent, or Firm* — Sutherland Asbill & Brennan LLP (57) ABSTRACT

The present invention generally relates to cashless transactions. In particular, the present invention relates to methods (100) for conducting cashless transactions and systems (400, 500) for implementing said methods. In a first aspect there is provided a method (100) of processing a cashless transaction. The method includes, determining (102) a first identification from a first identification device (426); pre-authorising (104) the cashless transaction on the basis of first identification; determining (106) a second identification from a second identification device (420A); and in the event that the first identification and the second identification are associated, authorising (110) the cashless transaction.

40 Claims, 5 Drawing Sheets

U.S. PATENT DOCUMENTS

2005/0218214 A1 10/2005 Gravelle et al.
2007/0080169 A1 4/2007 Sher et al.
2007/0131715 A1 6/2007 Minard et al.
2009/0043681 A1 2/2009 Shoji et al.

* cited by examiner

TRANSACTION SYSTEM AND METHOD

FIELD OF THE INVENTION

The present invention generally relates to cashless transactions. In particular, the present invention relates to methods for conducting cashless transactions and systems for implementing said methods.

BACKGROUND OF THE INVENTION

Cashless transactions are becoming increasingly common, with consumers rapidly replacing traditional methods of payment with electronic methods to pay for their purchases.

Processing cashless transactions can be more time consuming for both the merchant and customer than the equivalent transaction using cash. For example, the traditional process for accepting credit card payments involved the merchant making a manual imprint of the credit card and manually completing a credit card slip by hand. In more recent years credit card transactions and debit card transactions have been performed using electronic systems. Notwithstanding this change, these transactions can still be relatively slow as electronic systems typically require authentication of the transaction by the holder of the credit or debit card to complete the transaction. For credit cards authentication typically requires a signature from the card holder, and requires the merchant to compare the received signature to a signature on the card. For debit card transactions authentication typically requires the card user to enter a personal identification number (PIN) into a point of service transaction terminal.

Even though these electronic systems are automated to some extent they can still be time consuming for the merchant and customer. Transaction speed can be particularly problematic in transaction environments that process a large number of relatively low value transactions, such as fast food restaurants or service stations, where convenience to the customer is of key importance, and slow transactions may ultimately lead to reduced sales.

Accordingly, there is a need for an alternative form of cashless transaction that may address one or more of the above mentioned drawbacks of known cashless transaction systems.

SUMMARY OF THE INVENTION

In a first aspect the present invention provides a method of processing a cashless transaction including:
 determining a first identification from a first identification device;
 pre-authorising the cashless transaction on the basis of first identification;
 determining a second identification from a second identification device; and
 in the event that the first identification and the second identification are associated, authorising the cashless transaction.

Determining the first identification from the first identification device can include determining a unique identifier corresponding to the first identification device.

Pre-authorising the cashless transaction can include one or more of the following:
 identifying a user, or group or users, authorised to use the first identification device on the basis of first identification;
 identifying one or more financial accounts to be used in the transaction on the basis of first identification;
 determining whether a there is a valid second identification associated with the first identification device that can be used to authorise a transaction;
 retrieving user profile data relating to a user, or group or users, authorised to use the first identification device to make a cashless transaction;
 determining at least one authorisation criterion that must be met to authorise the transaction.

Determining the first identification from the first identification device can include, receiving identification data from the first identification device. It can also include, reading the identification data from the first identification device.

Preferably the first identification device is a radio frequency transponder.

The authorisation criterion (or criteria) may be based on at least one of the following factors:
 the identity of the individual making the transaction;
 the value of the transaction;
 a transaction value limit;
 a user account status;
 a financial account status;
 a financial account balance;
 the location at which the transaction is made;
 the time and/or date of the transaction;
 the type of association formed between the first identification and the second identification.

Determining a second identification from the second identification device can include, receiving identification data from the second identification device. It can also include reading the identification data from the second identification device.

The second identification device is preferably a passive identification device. The second identification device can include a machine readable indicium. Preferably the machine readable indicium is a one-dimensional barcode or two-dimensional barcode symbol.

Determining the second identification from the second identification device can include determining a unique identifier corresponding to the second identification device.

The method can include determining if the second identification is associated with the first identification. Determining if the second identification is associated with the first identification can include, interrogating an accounts database to determine whether the first identification device is associated with the second identification device.

Determining if the second identification is associated with the first identification can include, attempting to decrypt encrypted data received from one (or both) of the first and second identification devices, using data received from the respective other identification device, and in the event that the decryption is successful, verifying that an association has been formed between the second identification device and the first identification device.

Determining if the second identification is associated with the first identification can include comparing at least a portion of the data obtained from the first identification device to at least a portion of the data obtained from the second identification device to determine whether an association has been formed between the identification devices.

The second identification can include, identifying a financial account associated with the first identification device. The second identification can include identifying an individual authorised to operate a financial account associated with the first identification device.

In the event that preauthorisation identifies more than one authorised user or financial account associated with the first identification device, the second identification can include, identifying which user and/or which of the financial accounts associated with the first identification device is to be used in the transaction.

The method can also include storing transaction data relating to the transaction. Preferably the transaction data includes one of more of the following types of transaction data:

transaction value data, transaction participant data, data describing the nature of the transaction, the identification determined from the first identification device; the identification determined from the second identification device, the time and/or date of the transaction, the location at which the transaction took place.

Optionally the method can include receiving an authorisation code from a user to authorise a transaction. Preferably the authorisation code is a personal identification number (PIN) or password.

In certain embodiments, data obtained from the second identification device can be encrypted. In such a case the authorisation code can form part of a decryption scheme used to decrypt said data.

In a second aspect the present invention provides a system for processing a cashless transaction including: at least one first reader configured to read a first identification from a first identification device, at least one second reader configured to read second identification from a second identification device; and a transaction processing system computer configured to authorise the transaction if the first identification and the second identification are associated with each other.

In a third aspect the present invention provides a system for processing a cashless transaction including:

at least one first reader configured to read at least one of a first identification from a first identification device and a second identification from a second identification device; and a transaction processing system computer, configured to authorise the transaction if the first identification and the second identification are associated with each other.

The system can include at least one second reader configured to read the second identification from the second identification device.

The system can include data storage means in communication with the transaction processing system computer, that stores thereon an account database including account data for a plurality of user accounts, the account data for each user account including at least one identifier corresponding to at least one respective first identification device, and at least one associated identifier corresponding to at least one respective second identification device. The account data can also include financial account data identifying at least one financial account associated with the user account that can be used in a transaction.

The transaction processing system computer can be further configured to interrogate the database on the basis of the first identification to determine whether the first identification and second identification are associated with the same user account.

The transaction processing system computer can be further configured to decrypt encrypted data received from one (or both) of the first and second identification devices, using data received from the respective other identification device identification to determine whether the first identification and second identification are associated with the same user account.

In the event that the decryption is successful the transaction processing system computer is configured to verify that an association has been formed between the second identification device and the first identification device In the event that the a user account includes a plurality of second identifiers corresponding to a plurality of second identification devices, a financial account can be associated with a subset of the second identifiers.

The transaction processing system computer can be further configured to pre-authorise a cashless transaction on the basis of the first identification.

Pre-authorisation of a cashless transaction can include one or more of the following:

identifying, from the account database, that a user account corresponding to the first identification has at least one associated second identifier;

identifying a group of second identifiers respective ones of a plurality of user accounts corresponding to the first identification;

identifying a financial account to be used in the transaction on the basis of first identification;

determining at least one authorisation criterion that must be met to authorise the transaction.

In the event that one or both of the first or second identification devices is an active identification device then at least one reader can include a receiver configured to receive a transmission from one or both of the first or second identification devices A reader may include a transmitter configured to transmit an excitation signal to one or both of the first or second identification devices.

In the event that one or both of the first or second identification devices is an active identification device the excitation signal can be configured to trigger a response from one or both of the first or second identification devices or to generate a signal transmitted by the identification device.

In the event that one or both of the first or second identification devices is a passive identification device the excitation signal can be configured to be at least partially reflected by one or both of the first or second identification devices.

Preferably the system includes two readers, a first reader configured to read the first identification from the first identification device and a second reader configured to read the second identification from the second identification device. Preferably the two readers are of different types.

Preferably the first reader is a radio frequency transponder tag reader.

Preferably the second reader is a symbol reader.

The system can optionally also include a remote terminal in data communication with the transaction processing system computer and the at least one reader, and be configured to receive identification data from the at least one reader and communicate said identification data to the transaction processing system computer.

The remote terminal can include an interface component configured to communicate with a point of sale system of a merchant or other transaction participant. The interface component can be configured to receive transaction data for a cashless transaction for communication to the transaction processing system computer.

The system can further include an account interface component configured to enable a user account to be established and/or edited. The account interface component can be implemented as a website.

In a fourth aspect the present invention provides a method of enabling the establishment of an account to be used for conducting a cashless transaction by a user of a first identification device, said cashless transaction being authorised using a second identification device, the method including:

providing an account database for storing account data; and receiving account data from a user including:
   data identifying a first identification device:
   data identifying a second identification device; and
   financial account data relating to at least one financial account;
creating an account for use in the cashless transaction processing system by establishing an association between the first identification device, the second identification device and at least one financial account.

The method can also include establishing an authorisation code to be used in conjunction with the second identification device to authorise a transaction.

The authorisation code, can be a personal identification number or password. The authorisation code can be used to decrypt data received from the first and/or second identification devices.

The method may include a step of, distributing one or more second identification devices to a user of a first identification device.

Distributing one or more second identification devices can include transmitting data representative of a second identification device to enable generation of a second identification device.

The method may include a step of, providing a plurality of unique second identification devices that are not associated with a first identification device.

The method may include a step of, providing a second identification device that has been pre-associated with a predetermined first identification device such that an association can only be associated with said predetermined first identification device.

Establishing the association between the first identification device and at least one of said plurality of second identification devices includes obtaining at least one of the following types of data for storage in the account database:
   the name of the user of a first identification device;
   an identifier associated with the second identification device;
   demographic data relating to the user;
   financial account data relating to an account to be used in a cashless transaction.

Preferably the method includes providing a website including at least one webpage to enable updating of the account database.

Preferably the updating of the account data relating to the first identification device can only be done by an authorised user of the first identification device.

A plurality of second identification devices can be associated with the first identification device. In this case it is preferable that each user of the first identification device is associated with a unique second identification device.

The first identification device is preferably a radio frequency identification device. The second identification device preferably includes a barcode, two-dimensional symbol or RFID token.

In a fifth aspect the present invention provides a method of establishing an account to be used for conducting a cashless transaction by a user of a first identification device, said cashless transaction being authorised using a second identification device, the method including:
   receiving account data from a user including:—
   data identifying a first identification device, and
   financial account data relating to at least one financial account; and
   generating identification data, to be encoded into a second identification device, for use in authorising a cashless transaction using the account.

The method can include transmitting the identification data to a user for encoding into a second identification device.

The method can include generating said second identification device using said identification data.

BRIEF DESCRIPTION OF THE DRAWINGS

Illustrative embodiments of the invention will now be described by way of non-limiting example only with reference to the accompanying drawings, in which.

DETAILED DESCRIPTION OF THE EMBODIMENTS

The present inventors have identified that a pool of existing machine readable identification devices that can be used to identify an individual (or group of individuals) can be used to establish a system for conducting cashless transactions using these devices.

Figure 1:
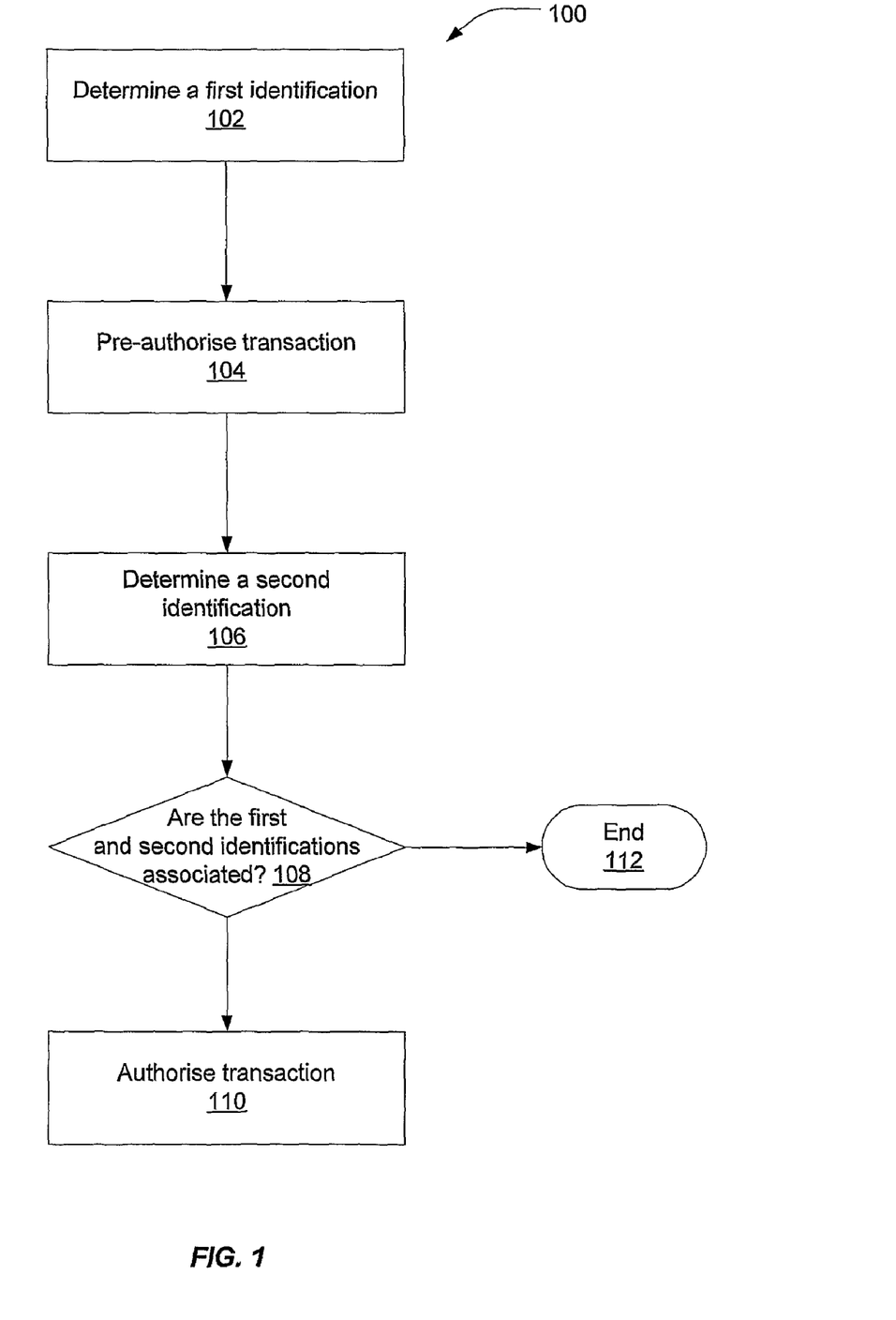
FIG. 1 shows a flowchart depicting the steps in a method of processing a cashless transaction according to an embodiment of the present invention.

FIG. 1 depicts a flow chart 100 illustrating the steps in a method for processing a cashless transaction in accordance with the first embodiment of the present invention. For example the cashless transaction may be a purchase or refund or other type of transaction which the monetary value is transferred from one party to another. By way of overview, in the present embodiment the cashless transaction is processed to an account of one of the parties to the transaction, for example the purchaser of an item, on the basis of a first identification which is determined from a first identification device, and the transaction is authorised using a second identification device.

Accordingly, the method 100 begins by determining a first identification 102 using a first identification device. The first identification device is preferably a device such as a radio frequency ID tag of the type used to pay road tolls or the like. In the next step the identification information derived from the first identification device in step 102 is used in step 104 to pre-authorise the transaction. The pre-authorisation can include a range of sub processes such as:
   determining whether or not one or a group of financial accounts exist for use in the transaction;
   determining the status of any financial account associated with the first identification device, for example whether the account is in credit or debit whether it is active or suspended or the like;
   determining whether the first identification is associated with a second identification device which can be used to authenticate the transaction;
   in the event that a second identification device exists pre-authorisation can include retrieving data related to the second identification device from a database;
   retrieving a user profile or purchase history for the identification;

retrieving customer loyalty program, discount data or the like related to the identification device user(s);

ascertaining whether there are any authorisation criteria which must be met in order to allow the transaction to proceed.

Authorisation criteria can be related to factors including, but not limited to: whether the value of the transaction falls within a predetermined range, the identity of the parties performing the transaction, the date and time at which the transaction is being performed. Other factors on which authorisation criterion can be based can be readily identified by those skilled in the art. These may be factors that affect the security of the transaction or the account holder's desire to allow a particular transaction to be performed. For example, the holder of the financial account may only allow transactions with certain shops using this cashless transaction method, this may include certain service stations or fast food restaurants. The holder of the first identification device may only allow transaction up to a certain monetary value to be performed in this manner. More valuable transactions may need to be authorised using additional authorisation criteria, such as a personal identification number (PIN) or password.

The first identification and pre-authorisation steps can be performed as soon as the first identification device is able to be read by its respective reader. Thus it is possible to have the pre-authorisation step completed before the customer has made a purchase or ordered a service. In this regard the first identification can take place at the time the customer enters the merchant's premises, or when the user drives his or her car into the car-park of the merchants store or "drive-through" service lane.

As will be understood by those skilled in the art the ability to obtain customer data before a transaction is completed, or even before the customer arrives at a sales counter or orders a particular product or service, may be advantageous to a merchant. For example incentives or discounts can be offered to the customer to induce them to make an additional purchase in this transaction. This differs over most systems that use incentives to influence a customer's spending habits which typically offer an incentive to return to the store by offering a discount on the next purchase, after the current transaction is complete.

In the next step 106 the second identification is determined on the basis of a second identification device. This step 106 is delayed until after the customer has finalised their purchases or orders, and confirms the customer's intention to pay for their transaction using the cashless payment system. If the second identification device is not used to authorise the transaction it must be completed using another form of payment. The second identification device preferably provides a unique identifier which is corresponds to the individual making the transaction using the first identification device. Thus the second identification device effectively provides a digital signature for the transaction.

In certain embodiments of the present invention where additional security is required a personal identification number (PIN) or password can be used to authorise the transaction. In one example the PIN or password could form part of an encryption key that is used to decode data read from the second identification device. Assuming that only authorised users of the second identification device know this password this ensures that transactions are performed by authorised users.

There may be situations in which more than one person will be authorised to use the same first identification device to conduct a transaction. In this case a plurality of second identification devices can be used, with each of the second identifiers corresponding to a different user of the first identification device. In this case, the second identification device in addition to digitally authorising the transaction serves to identify which of the users of the first identification device is taking part in the transaction. By differentiating between customers using the same first identified device, their purchases can be billed to the correct financial account. Moreover, by creating a one-to-one relationship between the second identification device and its user it is possible to build a purchasing profile for the individual. This profile can be used, inter alia, to direct marketing material to the individual or to keep a track of purchases for use in royalty or rewards programs.

In the next step 108 a check is made to determine whether the first identification made in step 102 and the second identification made in 106 are associated with each other. In the event that they are, the transaction is authorised at step 110. If they are not associated the transaction is not authorised at step 112. Thus step 108 effectively checks whether the digital signature, in the form or the second identification device is valid for use with the first identifier.

As will be described below, in certain implementations of the invention the first identification (and preferably also the pre-authorisation of the transaction) is performed automatically, i.e. without initiation by the customer and/or the merchant. When using such a system the first identification and pre-authorisation may take place before the customer has decided to make a purchase, or decided how he or she will pay for his or her purchase. In the event that the customer makes no purchase or chooses to pay cash or with another form of payment the method is aborted without a transaction being processed.

In most embodiments of the present invention an association will be formed by a user of the first identification device by registering a respective second identification device with the transaction processing system operator. The process for creating such an association will be described in greater detail below.

Figure 2:
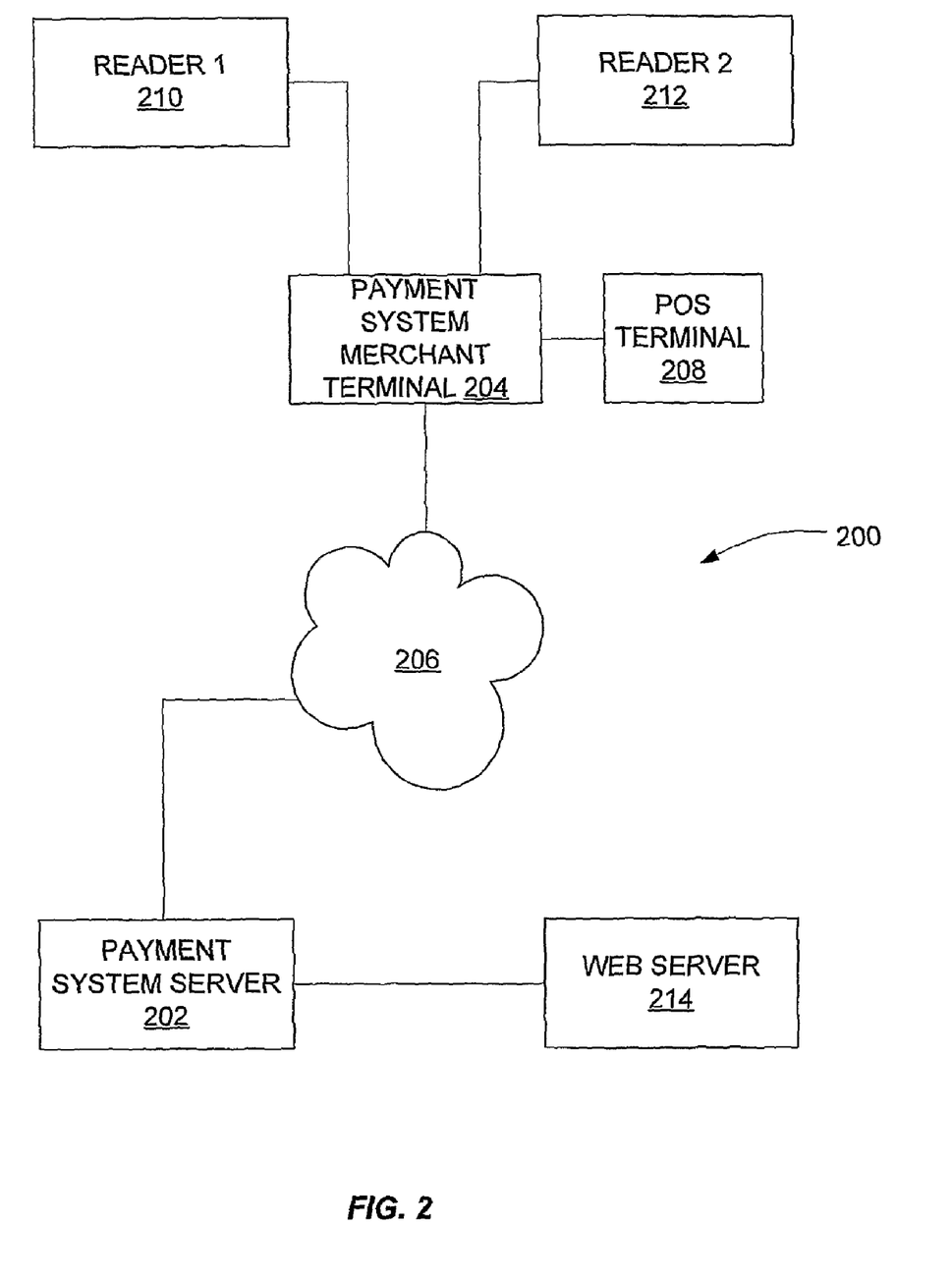
FIG. 2 shows a schematic representation of system for processing cashless transactions according to a first embodiment of the present invention.

In order to assist in understanding the method described in connection with FIG. 1, FIG. 2 shows a schematic embodiment of a system configured to implement such a method. The system 200 includes a payment system server 202 which will run payment system software configured to implement the method described in FIG. 1. The payment system server 202 is connected to a payment system merchant terminal 204 via a computer network 206. The computer network 206 can be a wide area network or the Internet. The payment system merchant terminal 204 is an optional part of the network and in other embodiments of the inventions its functionality could be provided in the payment system server 202 or the merchant's point of service terminal. In the present embodiment the payment system merchant terminal 204 provides an interface between the point of sale terminal 208 of the merchant and the payment system server 202.

In use, the point of sale terminal 208 is used to process a transaction such as purchase of goods or services by a customer in the traditional way however, when it comes time to pay for the transaction the transaction details are sent to the payment system server 202 for payment rather than payment being made by cash, credit card or other payment means.

The payment system merchant terminal 204 is also coupled to two identification device readers 210 and 212. In the illustrative embodiment the two identification device readers are of different types and are configured to read identification data from machine readable identification devices of different types. For example, in the preferred embodiment of the present invention reader 210 is an RFID tag reader and reader 212 is a two dimensional symbol reader.

In use, a user of a RFID tag which has an account registered with the payment system server 202 can use the system to conduct a cashless transaction with a merchant as follows. Upon arrival at the merchant's premises, or at some later time while conducting a transaction, the first identification device of the customer is read by the reader 210 to determine a first identification (step 102 of the method of FIG. 1). The first identification can be made by the first reader 210 detecting a unique identifier from the first identification device. This identification is passed from the reader 210 to the payment system merchant terminal 204. As mentioned above, the time at which the first identification is read from the first identification device may vary depending upon the implementation of the present invention chosen, but will typically be conducted as soon as the first identification device of the customer is within reading range of the reader 210. Conversely, the first reader 210 may be activated by the payment system merchant terminal 204 in order to begin the transaction processing. In either case, the payment system merchant terminal 204 transmits the first identifier received from the first identification device to the payment system server 202 via the intervening network 206.

The payment system server 202 will typically include a database of customer accounts which can then be interrogated to perform pre-authorisation as described above in relation to step 104 of the method of FIG. 1. In particular the payment system server 202 will determine a set of second identifiers which are associated with the personal identification device in anticipation of step 206 of the method in which the customer attempts to authorise the transaction using a second identification device. If pre-authorisation is successful the customer uses a second identification device to authenticate the transaction.

Rather than this step being automated, this step preferably requires the customer to positively authorise the transaction, by for example, activating the second identification device, or presenting the second identification device to the reader 212. The second identification can for example be a device having a two dimensional symbol written on it which may be read by a two dimensional symbol reader.

The reader 212 reads the second identification device and passes a unique identifier associated with the second identification device to the payment system merchant terminal 204. This is in turn compared with the one or more second identifications associated with the first identification determined by the reader 210.

In the event that the second identifier is a valid second identifier associated with the first identifier the transaction will be authorised, and processed using a financial account associated with the second identifier. In the event that the second identification is not in association with the first identification the transaction will be denied and an alternative payment method for the transaction must be used.

As will be appreciated by those skilled in the art the step of comparing the second identifier read by the reader 212 to the set of one or more second identifiers associated with the first identification read by the reader 210 can be performed at either the payment system merchant terminal 204 or the payment system merchant server 202. In smaller systems it may be practical to have server side authentication processes. However, in larger systems where the processing burden on the system server 202 may become too great if many transactions are being processed then merchant side transaction authentication may be used in order to reduce server processing load. If merchant-side authentication is used the pre-authorisation step will include transmitting sufficient account data to the merchant terminal 206 to enable it to perform the authentication, such as the criteria set for authorising transactions, the list of valid second identities to authorise a transaction. As mentioned above, the association between the first and second identification devices can be encoded in the devices themselves to further reduce the data traffic in the network, processing load on the payment system server, and possibly transaction time. For example data read from the second identification device may include the identity of its associated first identification device(s). Alternatively the payment system may require data from an associated first identification device to decrypt data read from a second identification device (or vice versa).

Other factors which will be known to those skilled in the art can also be used to determine how the functions of the payment system can be split between the payment system merchant terminal 204 the payment system server 202, and optionally the merchants POS terminal 208. In certain other embodiments the cashless transaction can be processed directly to the customer's bank account, e.g. a credit card account, by the merchant's POS terminal, with the cashless transaction system being used to provide the POS terminal with the relevant account data to allow processing and to authorise the transaction without the use of a customer's signature.

In the illustrative embodiment the payment system server 202 is also coupled to a web server 214. The web server 214 is configured to provide a web page interface to the payment system to enable the establishment and administration of customer accounts with the cashless payment system. A more detailed description of the account creation process will be given below.

Figure 3:
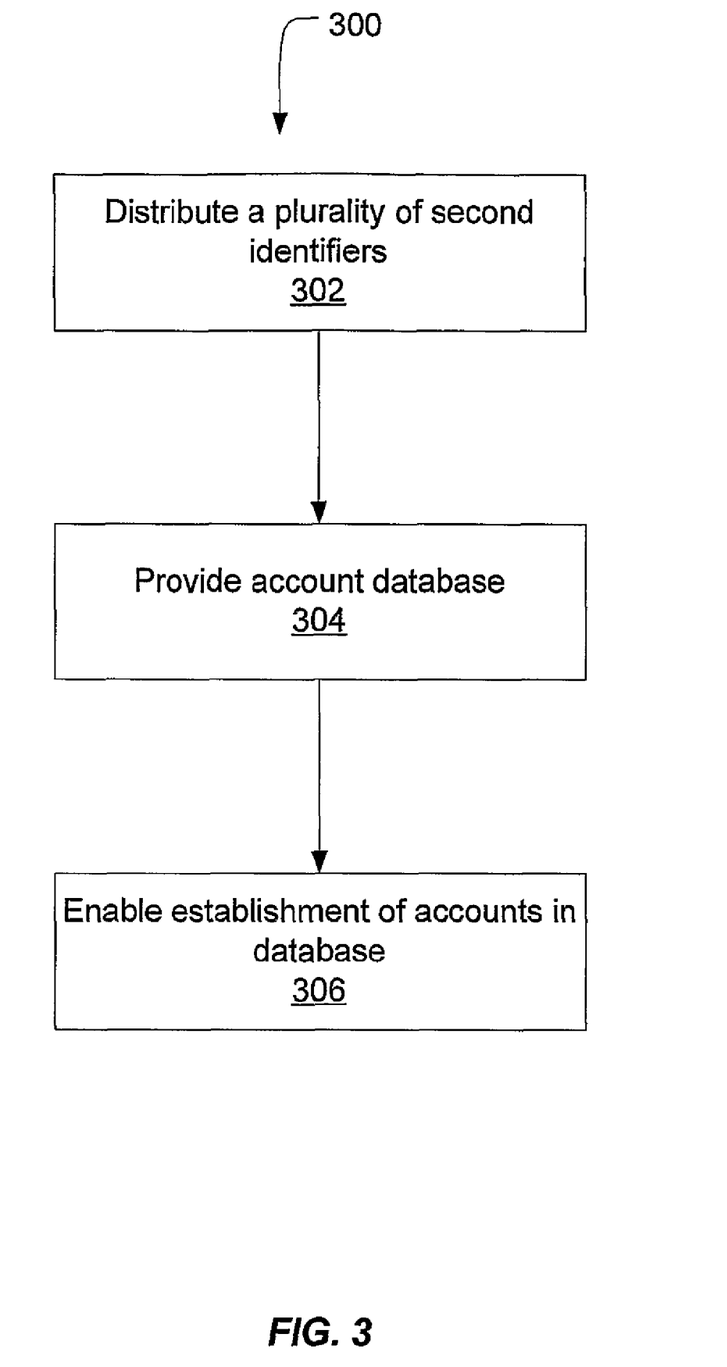
FIG. 3 shows a flowchart depicting the steps in a method of establishing an account for use in a cashless transaction according to an embodiment of the present invention.

FIG. 3 depicts a flow chart showing the steps in a method for establishing an account for use in a cashless transaction system.

The present inventors have realised that with the proliferation of machine readable identification devices, such as RFID tags used for toll payment there is an existing base of identification devices which may be conveniently used for cashless transactions. The present inventors have also identified that a user of such identification devices could be allowed to set up an account for performing a cashless transaction by linking the uniquely identifiable identification device with a unique second identification device and a financial account to create a relatively secure transaction environment. This situation enables at least two factor authentication for a cashless transaction and the ability to uniquely identify the person conducting the transaction.

Turning now to FIG. 3 which depicts the process for establishing a cashless transaction account used by a customer that already possesses a device that can be used as a first identification device. Typically there will be many such individuals in an economy, and as such there may be a plurality of first identifiers are already in use, for example, the users of a particular toll payment system that uses RFID tokens to conduct automated toll payment. In this case a plurality of second identifiers can be distributed amongst these users in step 302.

In the preferred embodiment the second identification device includes a machine readable identification, e.g. a two dimensional symbol which may be read by a two dimensional symbol reader in a manner which will be known to those skilled in the art. The device may also include an associated humanly readable identifier which can be used in the registration process to associate the second identification device with the first identification device as described below.

In the next step an accounts database is provided. The accounts database will typically be a relational database storing data relating to cashless transaction accounts for one or more users of first identification devices. For example, the database may include fields storing data such as; a uniquely identifiable identifier associated with a first identification device, a uniquely identifiable identifier associated with a corresponding second identification device, other identifiers such as personal identification numbers or passwords, details of authorised users of the first and/or second identification device and a financial account linked to the use of the second identification device. Other account data that will readily be ascertainable to those skilled in the art may also be stored in the accounts database.

Next in step 306 the system operator provides a user of the first identification device with the ability to have the accounts database updated to associate one or more of the distributed second identification devices with first identification device. In this regard, this step may be enabled by providing an online or web-based interface to the accounts database or using data entry personal. Alternatively an automated voice response system could be used to collect data from the user of the first identification device.

To create an association between a second identification device and the first identification device the authorised user of the first identification device simply enters the unique identification code associated with the second identification device into the accounts database in the appropriate database field. The name of an individual who is authorised to operate an account to perform a cashless transaction using the second identification device and the associated account details are also entered in the appropriate database fields by the authorised user.

Figure 4:
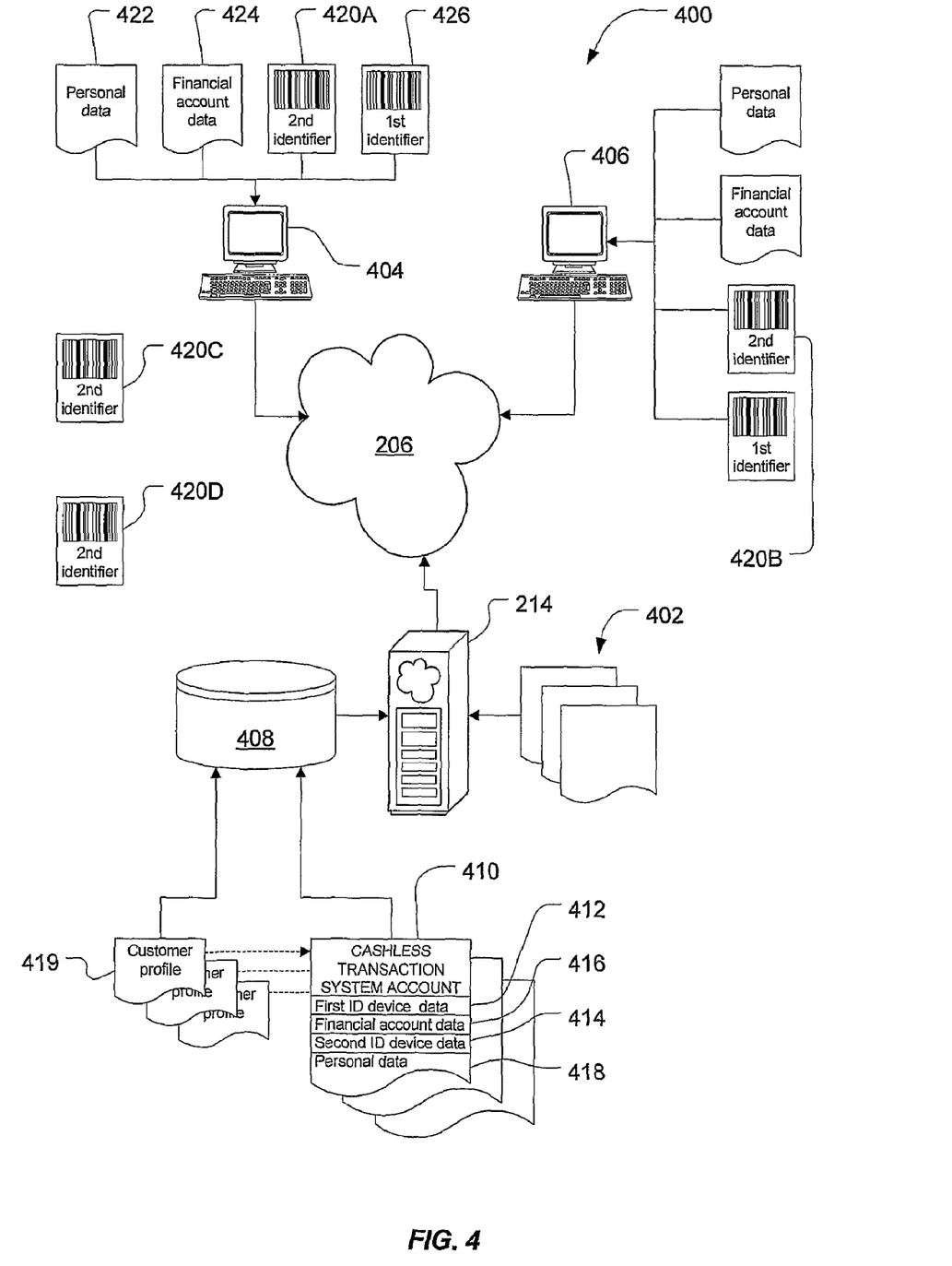
FIG. 4 depicts a schematic diagram showing the system for storing account data in a cashless transaction system according to the first embodiment of the present invention.

The system 400 of FIG. 4 can be used to illustrate an implementation of the method depicted in FIG. 3 and described above. The system includes a web server 214 as described in connection with FIG. 1 which is configured to store data which may be used to generate a website 402 including a plurality of web pages. The web pages 402 can be made available for download by users of remote computer terminals 404 and 406 via a data transmission network 206 such as the Internet. In certain embodiments the payment system server may be combined into the same server unit as the web server 214.

The terminals 404 and 406 will typically be personal computers, but may be other networkable computer devices. In the preferred implementation a user of one of the remote computers 404 and 406 is able to use a browser application running on his or her respective remote computer terminal 404 and 406 to view the website 402 made accessible by the web server 214. The web pages are used by the web server to provide the interface to the payment system database 408.

The payment system database 408 will typically be a relational database and can be configured to store a plurality of records containing transaction system account data for each of the users of the cashless transaction system. An exemplary record 410 is depicted. The record 410 includes the following types of data:

Identification data relating to the first identification device which will be used by the user when accessing the cashless transaction system—412.

Identification data relating to the second identification device which will be used by the user to authorise transactions using the cashless transaction system—414.

Financial account data specifying a financial account (or accounts) to be used when settling transactions processed using the system—416.

Personal data such the name, age and contact data or the user—418.

Account preference data (not shown) that can be used for setting authorisation criteria for transactions made also be stored in the user account 410.

The data types described above are given by way of illustration only and are susceptible to change depending on the implementation of the present invention being made. A person skilled in the art will readily be able to determine what type of data should be stored in the account database 208, and establish a suitable database structure for storing this data.

The payment system database 408 will typically also be accessible by the payment system server (not shown) which runs the cashless transaction system, inter alia, to process transactions. The payment system server may also store a customer profile 419 corresponding to each transaction system account 410 which can be used to track a customer's spending habits, product preferences, and other profile data that can be gleaned from the transactions processed by the transaction processing system. Customer loyalty and rewards program data may also be stored in the database 408.

The system 400 can be used as follows to create an account for use with the cashless transaction system.

The typical process for registering an account for use with cashless transaction system will begin by a user, eg, 404 or 406 having a suitable first identification device in their possession. If the user 404 or 406 does not already possess a first identification device of an appropriate type he or she may be instructed by the website 402 residing on the web server 214 how one may be acquired.

The user, eg 404, can then be provided with, or otherwise acquire a second identification device for use with the system.

In the preferred embodiment the second identification device is be a very low cost and easily distributable item, such as a card or sticker containing a machine readable indicium. The second identification devices may be freely distributed, or sold to users of first identification devices. Alternatively they may be made available to the general public or provided upon request.

Once the user, eg 404 or 406 has a first identification device and a second identification device, that user can begin the registration process. This typically occurs by the user accessing the website 402 provided by the web server 214.

For illustrative purposes the system 400 is shown as having four available second identification devices in circulation 420A to 420 D. In the present example identification devices 420A and 420B are associated with accounts stored in the database 408. Second identification devices 420C and 420D are not yet associated with a first identification device and thus may be used to register a new account for the cashless transaction system.

To register an account a user, e.g. the user of the terminal 404, accesses a page of the website 402. He or she can then create a new account by entering the data required into a web form forming part of the website 402. In this case the user of terminal 404 enters his or her Personal data 422, financial account data 424, identification data related to his or her second identification device 420A and identification data related to his or her first identification device 426. The data entered by the user is stored in the transaction system database 408 in the corresponding data fields.

To facilitate entry of data into the system, in the preferred embodiment the first and second identification devices include a humanly-readable portion and a machine readable portion. The humanly-readable portion may include the identification device's serial number or other identifier printed, displayed or able to be communicated to the user. This humanly-readable portion is used by the user of terminal 404 when setting up his or her account. This humanly-readable data can be correlated by the transaction system to a unique identification code embodied in the machine readable portion of the identifiers, using a lookup table or similar. The unique identification code embodied in the machine readable portion of the identifiers will be included in the data read from the identification devices in use when processing a transaction.

In alternative an embodiment the second identification device may be generated by the process of registering a user's account for use with the cashless transaction system. For example, the creation of an account may include the generation of a unique identifier corresponding to the account. This identifier could be provided to the user during the registration process to enable him or her to create the second identification device. For example a unique code created in the registration process can be used to generate a two dimensional symbol or other machine readable indicium, such as a barcode, which is transmitted to the user for him or her to print out for later use as a second identification device.

Conveniently if a two-dimensional barcode symbol, or similar indicium, is used as the second identification device the indicium can be printed on an adhesive substrate to form an ID sticker which can be attached to a convenient holder of the user's choosing. For example, a user may determine that they are likely to carry their cellular phone with them at most times that they are going to want to use the cashless transaction system, in this case the user can stick their ID sticker on the cover of their mobile phone for convenience.

In this example embodiment other data may also be encoded in the second identification device, including the identity of the first identification device. Moreover a personal identification number or password which can be encoded into the second identification device. Alternatively, if the user has a programmable second identification device, such as a programmable smartcard or the like, the unique code created during the registration process can be encoded and transmitted to the user in an appropriate data format and uploaded onto the programmable second identification device for use in authorising transactions.

By storing the details of a first identification device 426 and a second identification device 420A in the same account an association is formed between the two devices. Thus if a person possesses both devices a transaction can be made using the cashless transaction system.

Figure 5:
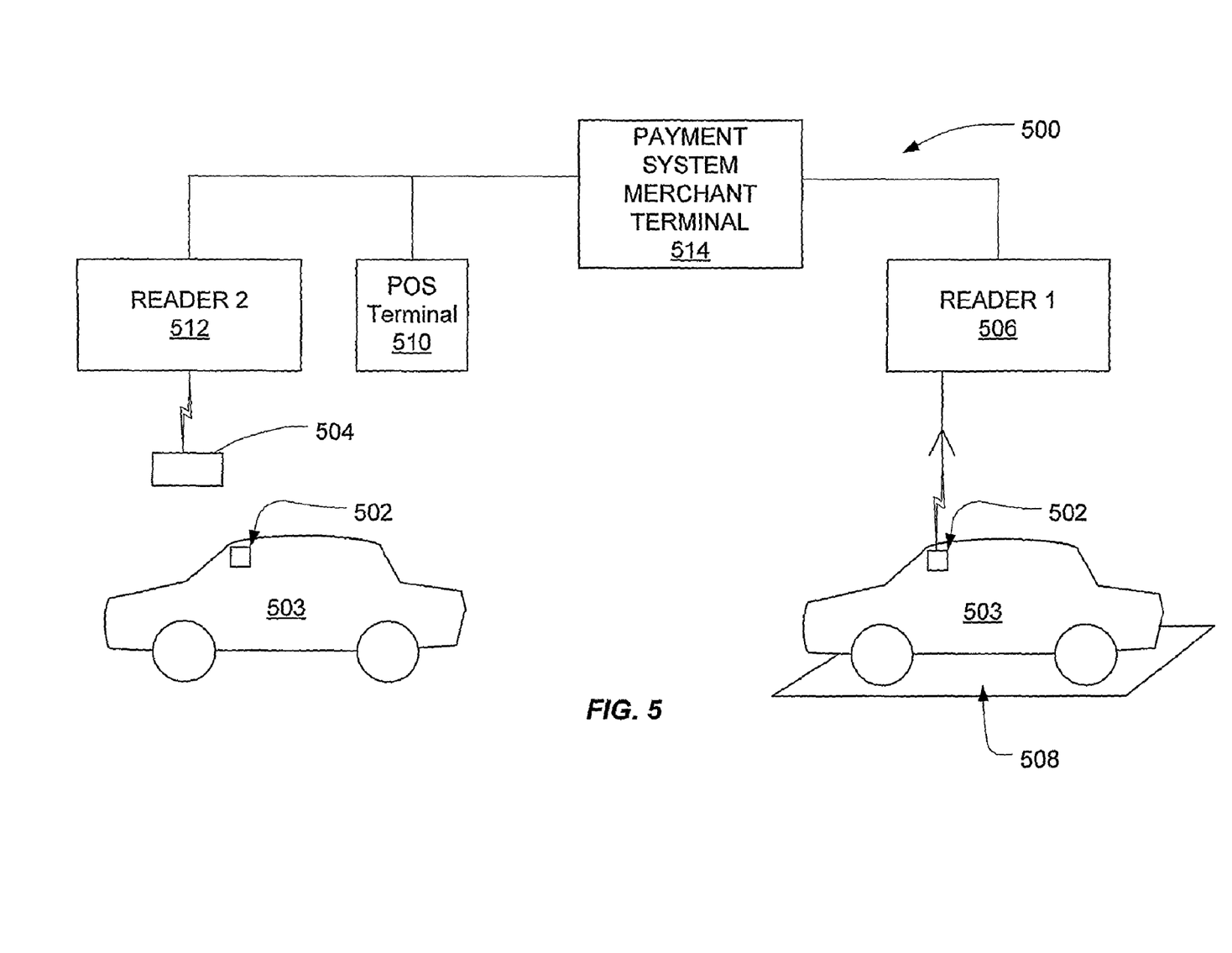
FIG. 5 depicts an exemplary system operating in accordance with an embodiment of the present invention.

FIG. 5 depicts an exemplary system 500 operating in accordance with an embodiment of the present invention. A system of the type shown in FIG. 5 could conveniently be installed in the drive-through lane of a fast food restaurant, service station, or other type of retail environment where customers are served in a position proximate to their motor vehicle.

In the present example the first identification device 502 is a radio frequency transponder token of the type commonly used by motorist to automatically pay road tolls. Tokens of this type are typically detachably mounted on the user's motor vehicle 503 and accordingly are well suited to use as a first identification device in the present example.

In this example, the second identification device 504 is also a radio frequency identification (RFID) token. In this case, the second identification device 504 is a passive RFID token, which only transmits data when it is caused to do so by an excitation signal (not shown) transmitted by the merchant.

The merchant-side system 500 including the merchant's point of sale system, and the merchant-side components of a cashless transaction processing system as described above. The system 500 has a first reader 506 which is adapted to read RFID tokens of the type used for first identification device 502. The reader 506 can be configured to read an RFID token mounted on each car that moves thorough a particular area 508, e.g. the entry to the drive-through lane, or a driveway entrance to a car park.

The system 500 also includes the merchant's point of sale (POS) terminal 510 on which a purchase can be processed. Associated with the POS terminal 510 is a second RFID token reader 512, which is adapted to read a passive RFID token of the type being used by the user as a second identification device 504. The reader 512 is configured to emit an excitation signal which causes the second identification device to transmit when it is placed within an area covered by the excitation signal of the reader.

The first reader 506, second reader 512 and POS terminal 510 are connected to the merchant system via a payment system merchant terminal 514 of the type described above in connection with FIG. 2.

In use, when the customer drives his or her motor vehicle 503 through the area 508 monitored by the first reader 506 the reader 506 reads the customer's RFID token 502. This data is passed to the payment system merchant terminal 514, and used for preauthorising the customer's transaction as described above.

The customer can then place their order or select items to purchase as normal, with the fulfilment and pricing transaction being processed through the merchant's POS terminal in the usual manner, except that payment for the transaction is made using the cashless transaction system. In most systems the customer or a customer service representative of the merchant will select a payment type on the POS terminal, indicating that the cashless transaction system will be used, however this step is optional.

To authorise the transaction the second reader 512 is used to read the customer's second RFID token 504. This data is passed to the payment system merchant terminal 514, and used for authorising the customer's transaction as described above.

If the transaction is authorised the purchase is complete. On the other hand if the transaction is not authorised the customer can be asked to complete the transaction using another form of payment.

As will be noted from the above an embodiment of the present invention is particularly convenient for customers in drive-through retail situations, and provides a relatively secure transaction for both the customer and the merchant. The preauthorisation step can safeguard the merchant from having a transaction dishonoured through the customer having insufficient funds in their account, and the dual factor identification protects the customer, as it decreases the likelihood of unauthorised use of their account. The ability to set authorisation rules also minimises the customer's risk for abuse of their account by allowing maximum transaction values and/or maximum aggregate transaction value over a certain time period to be set. The ability of the second identification device to optionally include encrypted personal PINs or passwords additionally minimises the chance of fraudulent use and identity theft. The system can also be set up to allow an account to be suspended if either of the identification devices is reported stolen or lost.

As will be appreciated the toll payment token used by many motorists will typically be used on a car with more than one driver, such with a family's car or company-car used by a group of employees. Embodiments of the present invention can cope with this situation by requiring each user of the car to have a separate customer account with the transaction processing system, thus requiring each user to have a different second identification device. In this case the second identification step is used to identify which of the drivers is making a transaction as well as to authorise the transaction.

In this way an embodiment of the present invention can still maintain a one-to-one relationship between users and accounts, which allows marketing, purchasing habits and demographic data to be more effectively collected.

If a user regularly drives more than one car which each has its own RFID token, a plurality of first identification devices can be associated with the user's account, and therefore can be used to preauthorise a transaction.

It should be noted that the application of the present invention is not limited to the exemplary types of identification devices described herein. Rather the invention should be considered to allow the use of any type of machine detectable or machine readable identification device or token, including but not limited to the following types:

Radio Frequency identification (RFID) token;
Magnetic stripe cards;
Contact and contactless, microchip based smart card;
Barcodes;
Two dimensional symbols or machine recognisable indicia;
Biometric identification, such as retina scan, finger print scan, voice scan, face scan;
Physical keys, e.g. a door key, car key or the like.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of processing a cashless transaction, comprising:
    determining a first identification from a first identification device, the first identification associated with a plurality of financial accounts;
    identifying one or more valid second identifications associated with the first identification, each valid second identification associated with only one of the plurality of financial accounts;
    in the event that at least one valid second identification is associated with the first identification, pre-authorizing the cashless transaction on the basis of the first identification;
    determining a second identification from a second identification device; and
    in the event that the second identification is one of the one or more valid second identifications associated with the first identification, authorizing the cashless transaction using the associated one of the plurality of financial accounts;
    wherein in the event that more than one valid second identification is associated with the first identification, determining the second identification includes identifying which of the plurality of financial accounts associated with the first identification is to be used in the transaction;
    wherein the prior steps are performed by one or more computers associated with a cashless transaction system.

2. The method of claim 1, wherein determining the first identification from the first identification device includes determining a unique identifier corresponding to the first identification device.

3. The method of claim 1, wherein pre-authorizing the cashless transaction includes one or more of the following:
    retrieving user profile data relating to a user, or group or users, authorized to use the first identification device to make a cashless transaction; and
    determining at least one authorization criterion that must be met to authorize the transaction.

4. The method of claim 1, wherein determining the first identification from the first identification device includes receiving identification data from the first identification device.

5. The method of claim 4, wherein determining the first identification from the first identification device further includes reading the identification data from the first identification device.

6. The method of claim 1, wherein either one or both of the first identification device and the second identification device is a radio frequency transponder.

7. The method of claim 3, wherein the authorization criterion is based on at least one of the following factors: an identity of the user making the transaction; a value of the transaction; a transaction value limit; a user account status; a financial account status; a financial account balance; a location at which the transaction is made; a time of the transaction; a date of the transaction; or a type of association formed between the first identification and the second identification.

8. The method of claim 1, wherein determining a second identification from a second identification device includes receiving identification data from the second identification device.

9. The method of claim 8, wherein determining a second identification from a second identification device further includes reading the identification data from the second identification device.

10. The method of claim 1, wherein the second identification device is a passive identification device.

11. The method of claim 10, wherein the second identification device includes a machine readable indicium.

12. The method of claim 11, wherein the machine readable indicium is a one-dimensional barcode or two-dimensional barcode symbol.

13. The method of claim 1, wherein determining a second identification from a second identification device includes determining a unique identifier corresponding to the second identification device.

14. The method of claim 1, wherein the method further includes determining if the second identification is associated with the first identification.

15. The method of claim 14, wherein determining if the second identification is associated with the first identification includes interrogating an accounts database.

16. The method of claim 14, wherein determining if the second identification is associated with the first identification includes:
    attempting to decrypt encrypted data received from one or both of the first and second identification devices using data received from the respective other identification device, and
    in the event that the decryption is successful, verifying that the second identification is associated with the first identification.

17. The method according to claim 14, wherein determining if the second identification is associated with the first identification includes comparing at least a portion of data obtained from the first identification device to at least a portion of data obtained from the second identification device.

18. The method of claim 1, further including storing transaction data relating to the transaction.

19. The method of claim 18, wherein the transaction data includes one or more of the following types of transaction data: transaction value data, transaction participant data, data describing the nature of the transaction, the first identification determined from the first identification device; the second identification determined from the second identification device, a time of the transaction; a date of the transaction, and a location at which the transaction took place.

20. The method of claim 1, further including receiving an authorization code from a user to authorize a transaction.

21. The method of claim 20, wherein the authorization code is a personal identification number (PIN) or password.

22. The method of claim 20, wherein the authorization code is used to decrypt data obtained from the second identification device.

23. A system for processing a cashless transaction comprising:
at least one first reader configured to read a first identification from a first identification device;
at least one second reader configured to read a second identification from a second identification device;
data storage means that stores an account database, the account database including account data for a plurality of user accounts, the account data for each user account including a valid first identification, a plurality of valid second identifications, and a plurality of valid financial accounts, wherein each valid second identification is associated with only one of the plurality of valid financial accounts; and
a transaction processing system in communication with the data storage means, the transaction processing system configured to:
authorize the cashless transaction in the event that the first and second identifications read by the first and second readers are associated with one user account in the account database, and
in the event that the one user account is associated with a plurality of valid financial accounts, identify for use in the cashless transaction the one valid financial account that is associated with the second identification read by the second reader.

24. The system according to claim 23, wherein the transaction processing system is further configured to interrogate the account database on the basis of the first identification to determine whether the first identification and second identification are associated with the one user account.

25. The system according to claim 23, wherein the transaction processing system is further configured to decrypt encrypted data received from one or both of the first and second identification devices; using data received from the respective other identification device to determine whether the first identification and second identification are associated with the one user account.

26. The system according to claim 25, wherein in the event that the decryption is successful the transaction processing system is configured to verify that the second identification and the first identification are associated with the one user account.

27. The system according to claim 23, wherein the transaction processing system is further configured to pre-authorize the cashless transaction on the basis of the first identification.

28. The system of claim 27, wherein pre-authorization of the cashless transaction includes one or more of the following:
identifying, from the account database, that the one user account corresponding to the first identification is associated with at least one valid second identification;
identifying the one or more valid second identifications associated with the first identification in the one user account;
identifying the plurality of valid financial accounts associated with the first identification in the one user account; and
determining at least one authorization criterion that must be met to authorize the transaction.

29. The system according to claim 23, wherein in the event that one or both of the first or second identification devices is an active identification device then at least one of the first or second readers includes a receiver configured to receive a transmission from one or both of the first or second identification devices.

30. The system of claim 29, wherein the at least one of the first or second readers includes a transmitter configured to transmit an excitation signal to one or both of the first or second identification devices.

31. The system of claim 30, wherein in the event that one or both of the first or second identification devices is an active identification device the excitation signal is configured to trigger a response from one or both of the first or second identification devices.

32. The system of claim 30, wherein in the event that one or both of the first or second identification devices is a passive identification device the excitation signal is configured to be at least partially reflected by one or both of the first or second identification devices.

33. The system of claim 23, wherein the first and second readers are of different types.

34. The system of claim 23, wherein at least one of the first and second readers is a radio frequency transponder reader.

35. The system of claim 23, wherein the second reader is a symbol reader.

36. The system of claim 23, further including a remote terminal in data communication with the transaction processing system and at least one of the first and second readers, the remote terminal configured to receive identification data from the at least one of the first and second readers and to communicate the identification data to the transaction processing system.

37. The system of claim 36, wherein the remote terminal includes an interface component configured to communicate with a point of sale system of a merchant or other transaction participant.

38. The system of claim 37, wherein the interface component is configured to receive transaction data for the cashless transaction for communication to the transaction processing system.

39. The system of claim 23, wherein the system further includes an account interface component configured to enable establishing and/or editing the account data.

40. The system of claim 39, wherein the account interface component is implemented as a website.

* * * * *